US011138472B2

(12) United States Patent
Sommer et al.

(10) Patent No.: US 11,138,472 B2
(45) Date of Patent: Oct. 5, 2021

(54) LOCALIZATION FOR MOBILE DEVICES

(71) Applicant: Apple Inc., Cupertino, CA (US)

(72) Inventors: Bruno M. Sommer, Sunnyvale, CA (US); Alexandre da Veiga, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 123 days.

(21) Appl. No.: 16/575,712

(22) Filed: Sep. 19, 2019

(65) Prior Publication Data

US 2020/0097770 A1 Mar. 26, 2020

Related U.S. Application Data

(60) Provisional application No. 62/736,516, filed on Sep. 26, 2018.

(51) Int. Cl.
*G06K 9/62* (2006.01)
*G06K 9/00* (2006.01)
(Continued)

(52) U.S. Cl.
CPC ....... *G06K 9/6257* (2013.01); *G06K 9/00624* (2013.01); *G06K 9/605* (2013.01); *G06T 7/20* (2013.01)

(58) Field of Classification Search
CPC .. G06K 9/6257; G06K 9/00624; G06K 9/605; G06T 7/20
(Continued)

(56) References Cited

U.S. PATENT DOCUMENTS

2010/0287485 A1* 11/2010 Bertolami ............... G06F 3/011
715/764
2011/0216090 A1* 9/2011 Woo ......................... G09G 5/00
345/633
(Continued)

FOREIGN PATENT DOCUMENTS

JP 2015005220 A 1/2015
WO 2013029674 A1 3/2013

OTHER PUBLICATIONS

Fong, W.T., et al., "Computer Vision Centric Hybrid Tracking for Augmented Reality In Outdoor Urban Environments", Proceedings of the 8th Intl Conf on Virtual Reality Continuum and its Applications in Industry, VRCAI 2009, pp. 185-190 (6 pp).
(Continued)

*Primary Examiner* — Michael R Neff
(74) *Attorney, Agent, or Firm* — Young Basile Hanlon & MacFarlane, P.C.

(57) ABSTRACT

Systems and methods for localization for mobile devices are described. Some implementations may include accessing motion data captured using one or more motion sensors; determining, based on the motion data, a coarse localization, wherein the coarse localization includes a first estimate of position; obtaining one or more feature point maps, wherein the feature point maps are associated with a position of the coarse localization; accessing images captured using one or more image sensors; determining, based on the images, a fine localization pose by localizing into a feature point map of the one or more feature point maps, wherein the fine localization pose includes a second estimate of position and an estimate of orientation; generating, based on the fine localization pose, a virtual object image including a view of a virtual object; and displaying the virtual object image.

21 Claims, 9 Drawing Sheets

(51) Int. Cl.
*G06K 9/60* (2006.01)
*G06T 7/20* (2017.01)

(58) Field of Classification Search
USPC .......................................................... 382/103
See application file for complete search history.

(56) References Cited

U.S. PATENT DOCUMENTS

| | | | |
|---|---|---|---|
| 2012/0243732 A1* | 9/2012 | Swaminathan | G06T 7/246 382/103 |
| 2014/0016821 A1 | 1/2014 | Arth et al. | |
| 2016/0148433 A1* | 5/2016 | Petrovskaya | G02B 27/01 345/633 |
| 2018/0285052 A1* | 10/2018 | Eade | G06T 19/006 |

OTHER PUBLICATIONS

Extended European Search Report dated Jan. 13, 2020, in co-pending EP Application No. 19186531.0 (9 pp).

* cited by examiner

900

910

SEARCH SPATIALLY PARTITIONED DATA STRUCTURE FOR CANDIDATE FEATURE POINT MAPS

920

PRIORITIZE CANDIDATE FEATURE POINT MAPS FOR TRANSMISSION BASED ON DISTANCE TO COARSE POSITION, COMPARISON OF COARSE ORIENTATION TO DIRECTION OF CANDIDATE FEATURE POINT MAP FROM COARSE POSITION, AND/OR A POINT DENSITY OF A CANDIDATE FEATURE POINT MAP

FIG. 9

LOCALIZATION FOR MOBILE DEVICES

CROSS-REFERENCE TO RELATED APPLICATIONS

This application claims the benefit of U.S. Provisional Application No. 62/736,516, filed on Sep. 26, 2018, entitled "Localization for Mobile Devices," the content of which is incorporated herein by reference in its entirety for all purposes.

TECHNICAL FIELD

This disclosure relates to localization for mobile devices.

BACKGROUND

Head-mounted displays are used to provide computer-generated reality (CGR) experiences for users. Objects of a virtual environment may be rendered at positions in a coordinate system of a head-mounted display.

SUMMARY

Disclosed herein are implementations of localization for mobile devices.

In a first aspect, the subject matter described in this specification can be embodied in systems that include a head-mounted display, one or more image sensors coupled to the head-mounted display, and one or more motion sensors coupled to the head-mounted display. The systems include a processing apparatus configured to access motion data captured using the one or more motion sensors; determine, based on the motion data, a coarse localization pose, wherein the coarse localization pose includes a first estimate of position of the head-mounted display and a first estimate of orientation of the head-mounted display; obtain one or more feature point maps, wherein the feature point maps are associated with a position of the coarse localization pose; access images captured using the one or more image sensors; determine, based on the images, a fine localization pose by localizing into a feature point map of the one or more feature point maps, wherein the fine localization pose includes a second estimate of position of the head-mounted display and a second estimate of orientation of the head-mounted display; generate, based on the fine localization pose, a virtual object image including a view of a virtual object; and display the virtual object image using the head-mounted display.

In a second aspect, the subject matter described in this specification can be embodied in methods that include, at an electronic device having one or more motion sensors, accessing motion data captured using the one or more motion sensors; determining, based on the motion data, a coarse localization, wherein the coarse localization includes a first estimate of position of the electronic device; obtaining one or more feature point maps, wherein the feature point maps are associated with a position of the coarse localization; accessing images captured using one or more image sensors; determining, based on the images, a fine localization pose by localizing into a feature point map of the one or more feature point maps, wherein the fine localization pose includes a second estimate of position and an estimate of orientation; generating, based on the fine localization pose, a virtual object image including a view of a virtual object; and displaying the virtual object image.

In a third aspect, the subject matter described in this specification can be embodied in systems that include a server configured to access feature point maps stored in a spatially partitioned data structure, and select one or more feature point maps from the spatially partitioned data structure based on an estimate of position; and a mobile computing device configured to determine a coarse localization including an estimate of position based on motion sensor data, transmit a request to the server that includes the coarse localization, and receive one or more feature point maps from the server that are selected by the server based on the coarse localization, determine a fine localization pose by localizing into a feature point map of the one or more feature point maps using captured images, wherein the fine localization pose includes a second estimate of position and an estimate of orientation, generate a virtual object image including a view of a virtual object based on the fine localization pose, and display the virtual object image.

In a fourth aspect, the subject matter described in this specification can be embodied in a non-transitory computer-readable storage medium. The non-transitory computer-readable storage medium may include executable instructions that, when executed by a processor, facilitate performance of operations, including accessing motion data captured using one or more motion sensors; determining, based on the motion data, a coarse localization, wherein the coarse localization includes a first estimate of position; obtaining one or more feature point maps, wherein the feature point maps are associated with a position of the coarse localization; accessing images captured using one or more image sensors; determining, based on the images, a fine localization pose by localizing into a feature point map of the one or more feature point maps, wherein the fine localization pose includes a second estimate of position and an estimate of orientation; generating, based on the fine localization pose, a virtual object image including a view of a virtual object; and displaying the virtual object image.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 9 is a flowchart of an example of a process for identifying one or more feature point maps for transmission based on a coarse localization.

DETAILED DESCRIPTION

Figure 1:
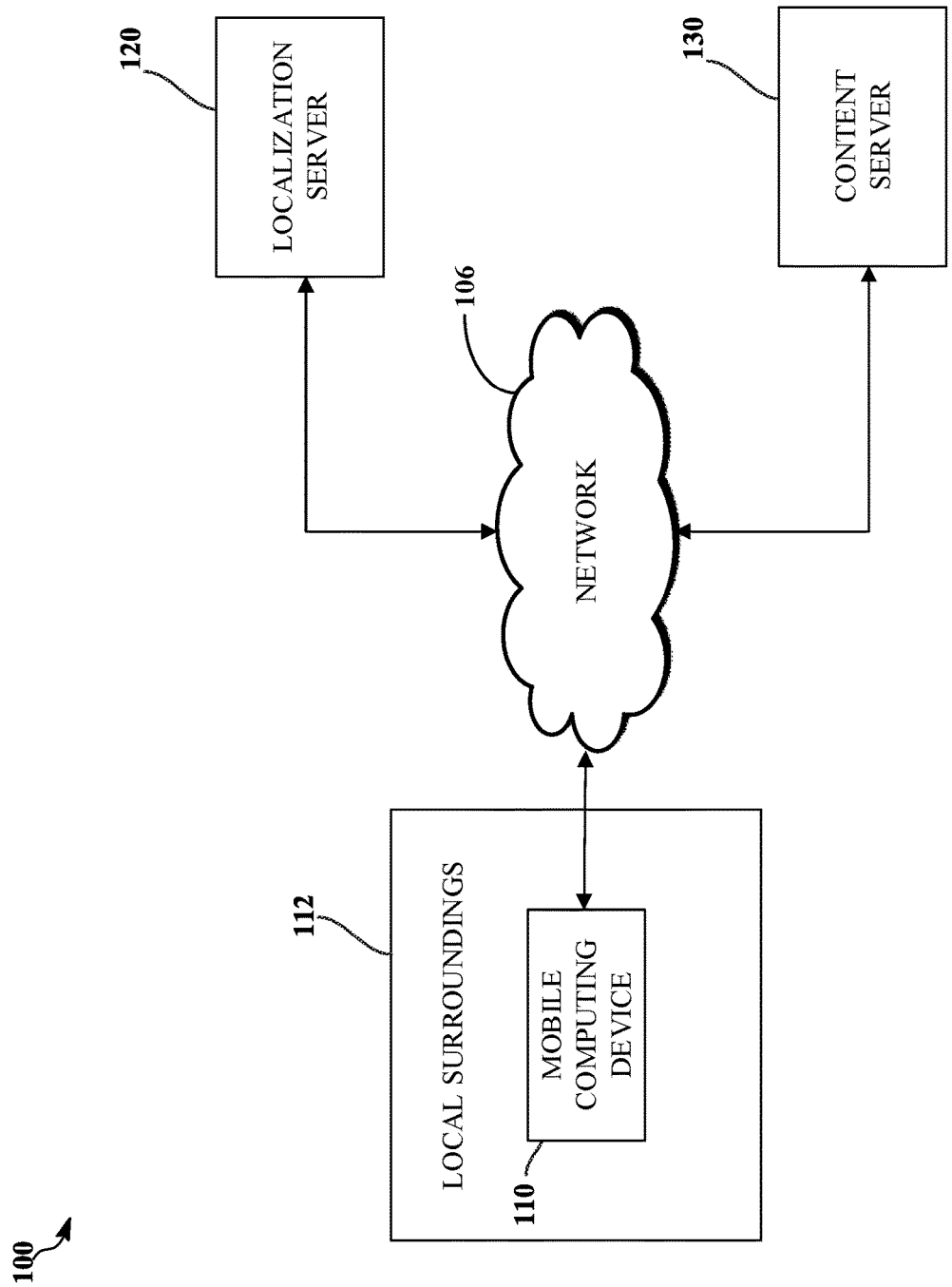
FIG. 1 is a block diagram of an example of a system configured to enable localization for CGR applications.

Described herein are systems and methods that provide a way for a mobile device to, with a high degree of accuracy and stability, determine its location and orientation in a coordinate system (e.g., a global coordinate system relative to the Earth). For example, these systems and methods may be used in the context of CGR applications with real world semantics, in which GPS alone may be insufficient because of accuracy and noise issues.

A global coordinate system is a system in which points on and above the surface of the Earth are associated with a unique coordinate tuple relative to the center of the Earth (e.g., a Cartesian coordinate (x,y,z) or a spherical coordinate ($\theta,\varphi,r$) or (lat, long, altitude)). A global position is a translation delta from the origin of the global coordinate system. A global orientation is a rotation delta from the identify transformation in the global coordinate system. For example, an orientation may be encoded as a quaternion or a 3×3 rotation matrix. A pose includes a position and an orientation in a coordinate system. A pose may have six degrees of freedom. A global pose is a combined global position and global orientation. For example, a pose may be encoded as a 4×4 matrix or as a combination of three floating point values (e.g., the global position) and either a quaternion or a 3×3 matrix (e.g., the global orientation).

Coarse localization is a process of determining the device's coordinate (e.g., a global coordinate) quickly, but with degrees of uncertainty, noise and/or instability. For example, coarse localization may be performed by processing measurements or sensor readings from one or more of the following types of motion sensors: GPS receivers, Wi-Fi or cellular triangulation, compasses, barometers, and/or inertial measurement units. A coarse localization can also refer to a result of a coarse localization process, which may include a position and/or an orientation (e.g., a coarse localization pose that includes both a position and an orientation).

Fine localization is a method of determining a device's coordinate (e.g., a global coordinate) with a higher degree of accuracy and stability than a coarse localization. Fine localization may compare images of a space captured from a device of interest to a model of the physical objects known to exist in the region of space to find a match to the perspective from device of interest that may indicate a pose of the device of interest when the images were captured. For example, bundle adjustment processing (e.g., using a SLAM (Simultaneous Localization And Mapping) algorithm) may be applied to localize into a feature point map to determine a pose of the device with high accuracy and stability. For example, in some CGR applications that render graphical representations of virtual objects (e.g., as 3D graphics) in real-world locations, the accuracy of a fine localization may typically be on the order of global position errors less than 10 cm and global orientation errors less than 0.1 degrees. A fine localization can also refer to a result of a fine localization process, which may include a position and/or an orientation (e.g., a fine localization pose that includes both a position and an orientation).

A feature point map is a collection of feature points (e.g., stored as a list of feature points) that can be used by computer vision algorithms. A feature point has a position (e.g., a position in a global coordinate system). For example, a feature point may include a three-tuple of floats that specify its position. In some implementations, a feature point may include one or more additional channels of data that describe properties of a feature point (e.g., colors or local textures). A feature point map may be associated with a region of space and may include feature points occurring within that region of space (e.g., a cube, a sphere, or a room). Feature point scanning is a process (e.g., a manual process) for collection of feature points and generating a feature point map of a location in the real world. For example, feature point scanning may be carried out using the same type of device that will later use the feature point map for CGR applications. For example, feature point scanning may be carried out using specialized scanning hardware including an array of image sensors and high precision sensors for surveying to determine a track an evolving pose of the array of image sensors.

Localization is a process by which a CGR application attempts to fine localize itself given an existing feature point map. For example, bundle adjustment processing (e.g., using a SLAM (Simultaneous Localization And Mapping) algorithm) may be applied to localize into a feature point map to determine a fine localization pose. For example, a localization process may fail in scenarios where the device is not actually in the region of space where those feature points exist, or if that region has changed, or if that region was not sufficiently scanned. A mobile computing device is a computing device which is typically moved or carried in everyday life. Some examples of mobile computing devices include a smartphone, a smartwatch, a tablet, or a head-mounted display (e.g., smart glasses). To facilitate operation of a CGR application, a mobile computing device may have access to two capabilities: a localization service, which may include a service or server or cloud asset that is running and accessible via the internet to assist a mobile computing device with coarse localization and/or fine localization; and a content service, which may include a service or server or cloud asset that is running and accessible via the internet that vends content to the application based on a global pose. Some implementations use a world map database, which is a database that exists as part of the localization service containing a spatially partitioned cache of feature point maps.

For example, operations of a system may include 1) an application starts up on a mobile computing device (e.g., a head-mounted display) and queries its coarse localization global pose. 2) A connection may be established with the localization service. 3) A coarse localization pose of the mobile computing device may be transmitted to the localization service. 4) The localization service may search a world map database for relevant, potential feature point maps using application specific search heuristics. 5) The localization service may begin streaming potential feature point maps back to the mobile computing device. 6) The mobile computing device attempts to localize into the feature point maps that the localization service is streaming to it. In the case of success at step 6), the mobile computing device is now fine localized. The mobile computing device may then contact the content service with the fine localization global pose to start streaming content associated with the real world location where the device is positioned to enable presentation of the content to a user. In the case of failure at step 6), localization was not possible into any of the candidate feature point maps. The mobile computing device may at this point tell the localization service to try a different search heuristic or broaden the search to additional feature point maps, eventually giving up and displaying some sort of "Failed to localize" message if localization is not successful.

Some implementations may provide advantages over earlier systems for localization for CGR applications, such as, reducing delay and/or processing resources (e.g., processor cycles, memory, and/or power) for performing a fine localization to a global coordinate system. Some implementations may enable the use of a centralized collection of feature point maps that can be frequently updated at scale to account for frequent changes in the layout of spaces.

Physical Environment
- a. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-Generated Reality
- a. In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object (s) in a CGR environment may be made in response to representations of physical motions (e.g., vocal commands).
- b. A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.
- c. Examples of CGR include virtual reality and mixed reality.

Virtual Reality
- a. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed Reality
- a. In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.
- b. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.
- c. Examples of mixed realities include augmented reality and augmented virtuality.
- d. Augmented reality
  - i. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.
  - ii. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof e. Augmented virtuality i. An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware a. There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a system 100 configured to enable localization for CGR applications. The system 100 includes a mobile computing device 110 that includes one or more image sensors for capturing images of local surroundings 112. The mobile computing device 110 is configured to communicate via a communications network 106 (e.g., the Internet or another wide area network, or a local area network) with a localization server 120 configured to feature point maps to assist with fine localization of the mobile computing device 110, and a content server 130 configured to provide content associated with the local surroundings 112 to a CGR application running on the mobile computing device 110 based on the fine localization (e.g., including a global position and/or a global orientation).

The system 100 includes a localization server 120 configured to access feature point maps stored in a spatially partitioned data structure, and select one or more feature point maps from the spatially partitioned data structure based on an estimate of position. For example, the estimate of position may be determined as a coarse localization based on motion sensor data for the mobile computing device 110. For example, the localization server 120 may implement the process 900 of FIG. 9. For example, the feature point maps stored in a spatially partitioned data structure may have been generated using a feature extraction process based on images captured of regions of space from known positions. For example, the localization server 120 may be implemented on the localization server 500 of FIG. 5. In some implementations, the spatially partitioned data structure is stored by the localization server (e.g., in the data storage device 520). In some implementations, the spatially partitioned data structure is stored in a separate database server (not shown) and accessed by the localization server via the communications network 106.

The system 100 includes a mobile computing device 110 configured to determine a coarse localization including an estimate of position based on motion sensor data. For example, the motion sensor data may include motion sensor data from a global positioning system (GPS) receiver attached to the mobile computing device 110. For example, the motion sensor data may include motion sensor data from an inertial measurement unit attached to the mobile computing device 110. For example, the motion sensor data may include motion sensor data from wireless signal receivers that are configured to triangulate a position of the mobile computing device 110 based on wireless signals (e.g., Wi-Fi signals or cellular signals) transmitted by the mobile computing device 110. In some implementations, the coarse localization of the mobile computing device also includes an estimate of orientation of the mobile computing device 110. The mobile computing device 110 may be configured to transmit a request to the localization server 120 that includes the coarse localization, and receive one or more feature point maps from the localization server 120 that are selected by the localization server 120 based on the coarse localization. The mobile computing device 110 may be configured to determine a fine localization pose by localizing into a feature point map of the one or more feature point maps using captured images of the local surroundings 112. For example, bundle adjustment processing (e.g., using a SLAM (Simultaneous Localization And Mapping) algorithm) may be applied to localize into a feature point map to determine the fine localization pose. The fine localization pose may include a second estimate of position and an estimate of orientation.

The system 100 includes a content server 130 configured to receive a request for content that includes the fine localization pose from the mobile computing device 110, and transmit content to the mobile computing device 110, wherein the content is selected by the content server 130 based on the request for content that includes the fine localization pose. For example, the content may describe one or more virtual objects associated with positions in the local surroundings 112. In some implementations (not shown in FIG. 1), the localization server 120 and the content server 130 may be combined in a single device. For example, the content server 130 may be implemented on the localization server 500 of FIG. 5.

The mobile computing device 110 may be configured to generate a virtual object image including a view of a virtual object based on the fine localization pose, and display the virtual object image. In some implementations, the mobile computing device 110 may transmit a request for content that includes the fine localization pose to the content server 130, and receive content (e.g., data describing one or more virtual objects) associated with positions in the local surroundings 112 in response to the message. For example, virtual object image (e.g., a left-eye image and/or a right-eye image) may be presented in a display of the mobile computing device 110. For example, the mobile computing device 110 may be a smartphone, a smartwatch, a tablet, or head-mounted display. For example, the mobile computing device 110 may include the mobile computing device 300 of FIG. 3. For example, the mobile computing device 110 may include the system 400 of FIG. 4.

Figure 2:
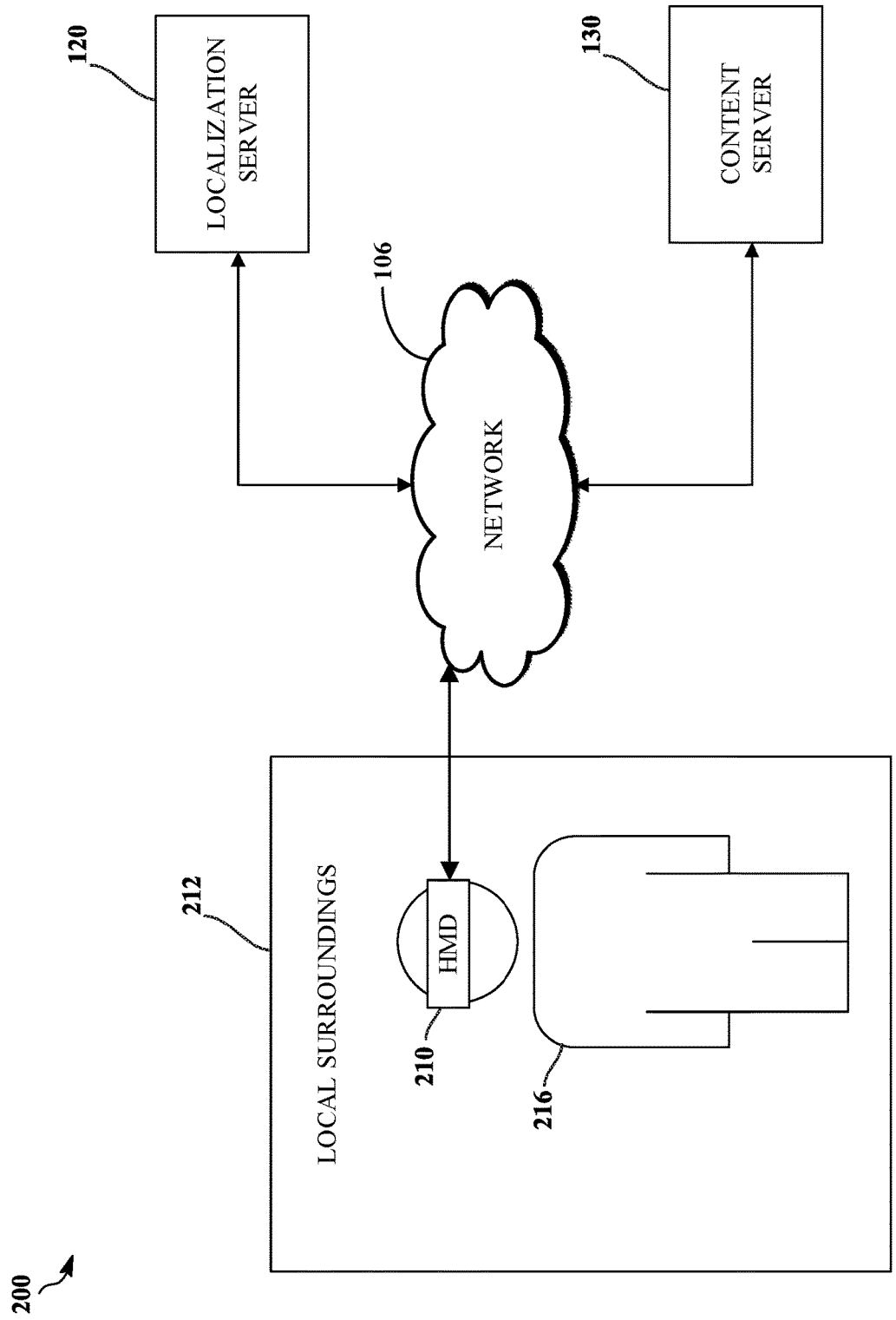
FIG. 2 is a block diagram of an example of a system configured to enable localization for CGR applications.

FIG. 2 is a block diagram of an example of a system 200 configured to enable localization for CGR applications. In the system 200 the mobile computing device includes a head-mounted display 210. The head-mounted display 210 is worn by a user 216 while the user views local surroundings 212. The head-mounted display 210 may be configured to communicate with the localization server 120 and the content server 130 via the communications network 106 in order to determine a fine localization for the head-mounted display 210 and generate and display virtual object images based on the fine localization (e.g., a fine localization pose in a global coordinate system). For example, the head-mounted display 210 may implement the process 600 of FIG. 6. For example, the head-mounted display 210 may include the mobile computing device 300 of FIG. 3. For example, the head-mounted display 210 may include the head-mounted display 410 of FIG. 4.

Figure 3:
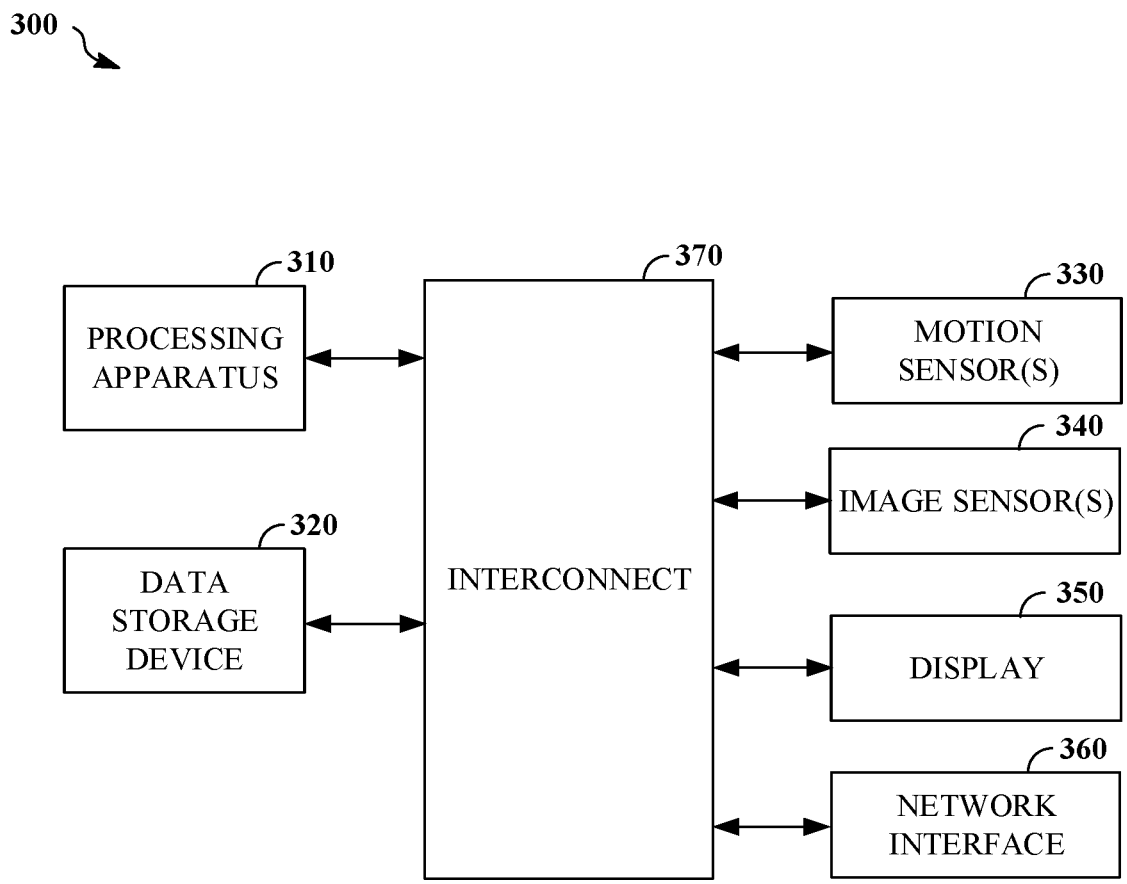
FIG. 3 is a block diagram of an example of a mobile computing device 300 configured to enable localization for CGR applications.

FIG. 3 is a block diagram of an example of a mobile computing device 300 configured to enable localization for CGR applications. The mobile computing device 300 includes a processing apparatus 310, a data storage device 320, one or more motion sensors 330, one or more image sensors 340, a display 350, and an interconnect 370 through which the processing apparatus 310 may access the other components. The mobile computing device 300 may be configured to determine a fine localization (e.g., including a global position and/or a global orientation) by localizing into a feature point map selected based on a coarse localization determined based on motion sensor data. For example, the mobile computing device 300 may be configured to implement the process 600 of FIG. 6. For example, the mobile computing device 300 may be configured to implement the process 700 of FIG. 7. For example, the mobile computing device 300 may be configured to implement the process 800 of FIG. 8.

The processing apparatus 310 may be operable to execute instructions that have been stored in a data storage device 320. In some implementations, the processing apparatus 310 is a processor with random access memory for temporarily storing instructions read from the data storage device 320 while the instructions are being executed. The processing apparatus 310 may include single or multiple processors each having single or multiple processing cores. Alternatively, the processing apparatus 310 may include another type of device, or multiple devices, capable of manipulating or processing data. For example, the data storage device 320 may be a non-volatile information storage device such as a hard drive, a solid-state drive, a read-only memory device (ROM), an optical disc, a magnetic disc, or any other suitable type of storage device such as a non-transitory computer readable memory. The data storage device 320 may include another type of device, or multiple devices, capable of storing data for retrieval or processing by the processing apparatus 310. The processing apparatus 310 may access and manipulate data stored in the data storage device 320 via the interconnect 370. For example, the data storage device 320 may store instructions executable by the processing apparatus 310 that upon execution by the processing apparatus 310 cause the processing apparatus 310 to perform operations (e.g., operations that implement the process 600 of FIG. 6). In some implementations, the processing apparatus 310 and the data storage device 320 are attached to the display 350.

The one or more motions sensors 330 may be configured to detect motion of the mobile computing device 300. For example, the one or more motions sensors 330 may include one or more accelerometers, gyroscopes, and/or magnetometers. For example, the one or more motions sensors 330 may include a global positioning system (GPS) receiver. In some implementations, the one or more motions sensors 330 are coupled (e.g., attached) to the display 350 (e.g., a head-mounted display). In some implementations, an orientation and/or a position of mobile computing device 300 in a real space may be determined based on motion sensor data from the one or more motions sensors 330. For example, changes in the orientation and/or a position of the mobile computing device 300 may be used as a control interface for a user to change a view of a CGR environment of a CGR application that is presented using the display 350.

The one or more image sensors 340 may be configured to capture images, converting light incident on the one or more image sensors 340 into one or more digital images. In some implementations, the one or more image sensors 340 are coupled (e.g., attached) to the display 350 (e.g., a head-mounted display). The one or more image sensors 340 may detect light of a certain spectrum (e.g., a visible spectrum and/or an infrared spectrum) and convey information constituting an image as electrical signals (e.g., analog or digital signals). For example, the one or more image sensors 340 may include charge-coupled devices (CCD) or active pixel sensors in complementary metal-oxide-semiconductor (CMOS). In some implementations, the one or more image sensors 340 include an analog-to-digital converter. For example, the one or more image sensors 340 may include an infrared camera and a visible light camera. The one or more image sensors 340 may include an image sensor configured to capture images of a vicinity of the mobile computing device 300. In some implementations, the one or more image sensors 340 include an array of image sensors arranged around a device (e.g., the head-mounted display 210) to provide a collective field of view spanning a wide angle. For example, the one or more image sensors 340 may be arranged to provide a panoramic view (e.g., a 360 degree panoramic view) of an area around a head-mounted display. For example, the one or more image sensors 340 may receive light through respective lenses (e.g., a fisheye lens or a rectilinear lens).

The display 350 includes a screen, a lens, or another type of optical assembly configured to direct light to the eyes of a user to enable the presentation of images (e.g., video frames) to the user. For example, the display 350 may include a touchscreen display, where the mobile computing device 300 is smartphone or tablet. In some implementations, the display 350 includes a head-mounted display (e.g., smart glasses), which may be held in place on a face of the user by a fastening article (e.g., a headband or a frame). In some implementations, a screen of the display 350 is positioned directly in front of eyes of the user. In some implementations, the display 350 includes an optical assembly (e.g., a lens and/or a mirror) that is positioned directly in front of eyes of the user and configured to direct light from a screen or projector of the display 350 to the eyes of the user. The optical assembly may also direct light from an environment around the user to eyes of the user. For example, the optical assembly may include a partially reflective polarizing film applied to an inner surface of a transparent visor. The optical assembly may function as an optical combiner. For example, a lens of the optical assembly may also let light from an environment in front of the user pass through to reach eyes of the user and allow the user to see in front of him while having objects of a CGR environment depicted in an image presented by the display 350 overlaid on a view of the physical environment in front of the user.

The network interface 360 facilitates communication with other devices, for example, the localization server 120 or the content server 130. For example, network interface 360 may facilitate communication via the communications network 106. For example, network interface 360 may facilitate communication via a Wi-Fi network, a cellular network and/or a wired network. For example, network interface 360 may facilitate communication via a WiMAX network. For example, network interface 360 may facilitate communication via a fiber optic network.

For example, the interconnect 370 may be a system bus, or a wired or wireless network (e.g., a body area network).

The processing apparatus 310 may be configured to enable localization for CGR applications. For example, the processing apparatus 310 may be configured to access motion data captured using the one or more motion sensors 330, and determine, based on the motion data, a coarse localization pose. For example, the coarse localization pose may include a first estimate of position of a head-mounted display of the display 350 and a first estimate of orientation of the head-mounted display. For example, the processing apparatus 310 may be configured to obtain one or more feature point maps. The feature point maps may be associated with a position of the coarse localization pose. For example, the processing apparatus 310 may be configured to access images captured using the one or more image sensors 340, and determine, based on the images, a fine localization pose by localizing into a feature point map of the one or more feature point maps. For example, the fine localization pose may include a second estimate of position of the head-mounted display and a second estimate of orientation of the head-mounted display. For example, the processing apparatus 310 may be configured to generate, based on the fine localization pose, a virtual object image including a view of a virtual object, and display the virtual object image using the head-mounted display. For example, the processing apparatus 310 may be configured to obtain the one or more feature point maps by transmitting, via a communications network (e.g., the communications network 106), the coarse localization pose to a localization server (e.g., the localization server 120), and receiving, via the communications network, the one or more feature point maps from the localization server. In some implementations, the one or more feature point maps from the localization server include a plurality of feature point maps received in succession, and the processing apparatus 310 may be configured to determine the fine localization pose by iteratively attempting to localize into the feature point maps of the plurality of feature point maps as they are received, requesting a next feature point map of the plurality of feature point maps from the localization server after failing to localize into a current feature point map of the plurality of feature point maps, and terminating reception of feature point maps of the plurality of feature point maps from the localization server responsive to successfully localizing into a current feature point map of the plurality of feature point maps. For example, the one or more feature point maps may be stored in an octree data structure that maps a physical space. For example, the one or more feature point maps may be associated with respective coordinates in a global coordinate system.

Figure 4:
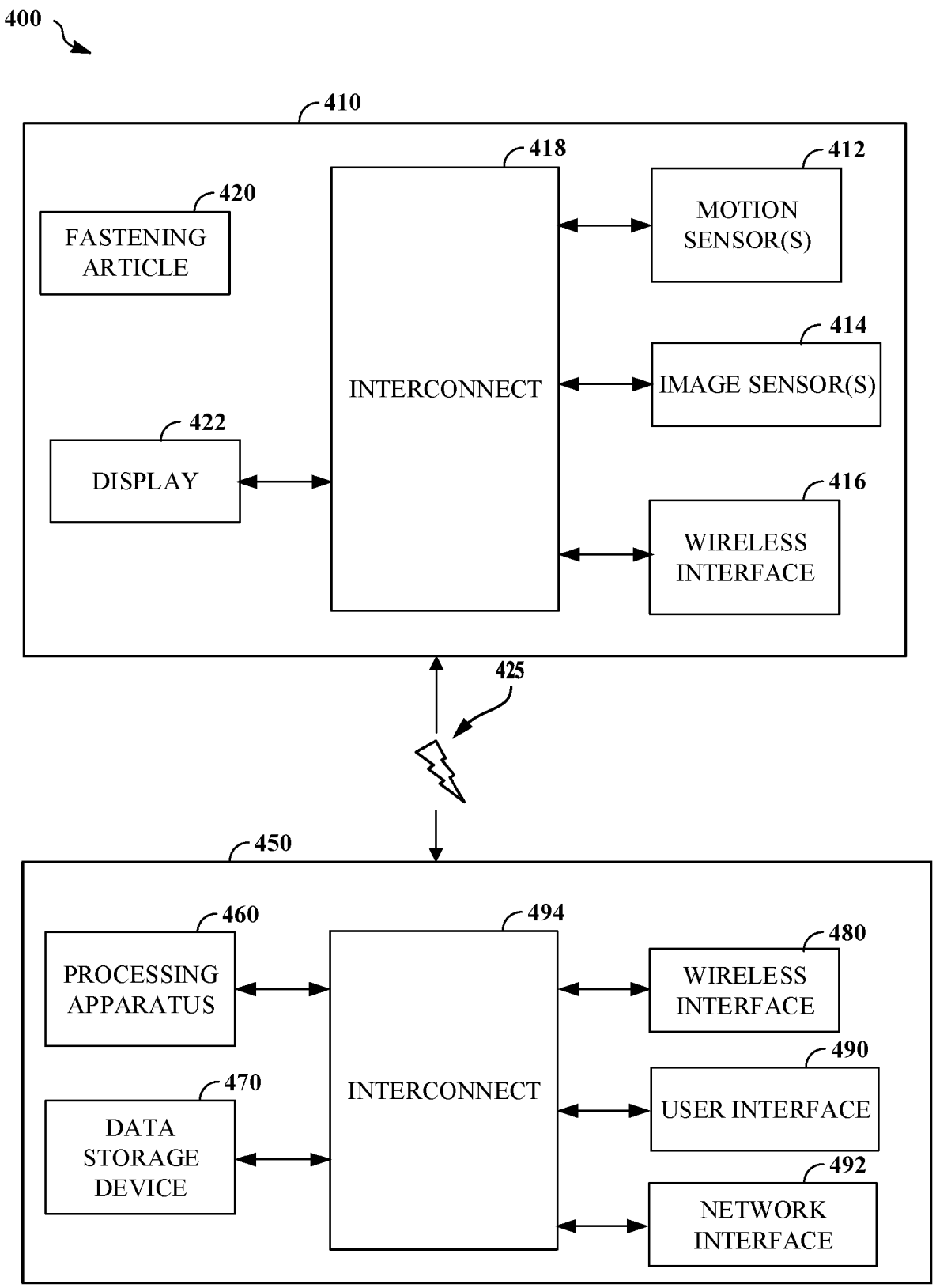
FIG. 4 is a block diagram of an example of a system configured to enable localization for CGR applications.

FIG. 4 is a block diagram of an example of a system 400 configured to enable localization for CGR applications. The system 400 includes a head-mounted display 410 and a computing device 450 that communicate via wireless communications link 425. The head-mounted display 410 includes one or more motions sensors 412, one or more image sensors 414, a wireless communications interface 416, a display 422, an interconnect 418 through which components of the head-mounted display may exchange information (e.g., under the control of microcontroller or other processing apparatus in the head-mounted display 410 that is not shown in FIG. 4), and a fastening article 420 configured to hold the head-mounted display 410 in place on a head of a user that is wearing the head-mounted display 410. The computing device 450 includes a processing apparatus 460, a data storage device 470, a wireless communications interface 480, a user interface 490, a network interface 492, and an interconnect 494 through which the processing apparatus 460 may access the other components of the computing device 450. The computing device 450 may be positioned near a user wearing the head-mounted display 410 and may perform computational tasks to control the head-mounted display 410. For example, the computing device 450 may be a smartphone, a tablet, a laptop, a desktop computer, or an appliance (e.g., a smart television or a smart speaker) on a table located in a room with the user, or the computing device 450 may be another wearable device worn at a different body part of the user (e.g., integrated with a vest worn on a chest). The system 400 may be configured to determine a fine localization (e.g., including a global position and/or a global orientation) by localizing into a feature point map selected based on a coarse localization determined based on motion sensor data. For example, the system 400 may be configured to implement the process 600 of FIG. 6. For example, the system 400 may be configured to implement the process 700 of FIG. 7. For example, the system 400 may be configured to implement the process 800 of FIG. 8.

The head-mounted display 410 includes one or more motion sensors 412. The one or more motions sensors 412 may be configured to detect motion of the head-mounted display 410. For example, the one or more motions sensors 412 may include one or more accelerometers, gyroscopes, and/or magnetometers. For example, the one or more motions sensors 412 may include a global positioning system (GPS) receiver. The one or more motions sensors 412 may be coupled (e.g., attached) to the head-mounted display 410. In some implementations, an orientation and/or a position of the head-mounted display 410 in a real space may be determined based on sensor data from the one or more motions sensors 412. For example, changes in the orientation and/or a position of the head-mounted display 410 may be used as a control interface for a user to change a view of a CGR environment of a CGR application that is presented using the head-mounted display 410.

The head-mounted display 410 includes one or more image sensors 414. The one or more image sensors 414 may be configured to capture images, converting light incident on the one or more image sensors 414 into one or more digital images. The one or more image sensors 414 are coupled (e.g., attached) to the head-mounted display 410. The one or more image sensors 414 may detect light of a certain spectrum (e.g., a visible spectrum and/or an infrared spectrum) and convey information constituting an image as electrical signals (e.g., analog or digital signals). For example, the one or more image sensors 414 may include charge-coupled devices (CCD) or active pixel sensors in complementary metal-oxide-semiconductor (CMOS). In some implementations, the one or more image sensors 414 include an analog-to-digital converter. For example, the one or more image sensors 414 may include an infrared camera and a visible light camera. The one or more image sensors 414 may include an image sensor configured to capture images of a vicinity of the head-mounted display 410. In some implementations, the one or more image sensors 414 include an array of image sensors arranged around the head-mounted display 410 to provide a collective field of view spanning a wide angle. For example, the one or more image sensors 414 may be arranged to provide a panoramic view (e.g., a 360 degree panoramic view) of an area around the head-mounted display 410. For example, the one or more image sensors 414 may receive light through respective lenses (e.g., a fisheye lens or a rectilinear lens).

The head-mounted display 410 includes a wireless communications interface 416. The wireless communications interface 416 facilitates communication with other devices, including the computing device 450. For example, wireless communications interface 416 may facilitate communication via a Wi-Fi network, a Bluetooth link, or a ZigBee link. In some implementations, the wireless communications interface 416 may be used to receive, from the computing device 450, data and/or instructions invoking presentation using the display 422 of a view of a CGR environment. In some implementations, the wireless communications interface 416 may be used to transmit sensor data from the one or more motion sensors 412 and/or images captured using the one or more image sensors 414 to the computing device 450.

The head-mounted display 410 includes a display 422. The display 422 may be configured to present images, converting digital images into light projected from the display 422. The display 422 may project light using an array of pixels that project light in a visible spectrum. The display 422 may include a screen, a lens, or another type of optical assembly configured to direct light to the eyes of a user wearing the head-mounted display 410 to enable the presentation of images (e.g., video frames) to the user. For example, the display 422 may include a screen, such as a liquid crystal display (LCD), a light emitting diode (LED) display (e.g., an OLED display), or other suitable screen. For example, the display 422 may include a projector. In some implementations, a screen of the display 422 is positioned directly in front of eyes of the user. In some implementations, the display 422 includes an optical assembly (e.g., a lens and/or a mirror) that is positioned directly in front of eyes of the user and configured to direct light from a screen or projector of the display 422 to the eyes of the user. The optical assembly may also direct light from an environment around the user to eyes of the user. For example, the optical assembly may include a partially reflective polarizing film applied to an inner surface of a transparent visor. The optical assembly may function as an optical combiner. For example, a lens of the optical assembly may also let light from a physical environment in front of the user pass through to reach eyes of the user and allow the user to see in front of him while having objects of a CGR environment depicted in an image presented by the display 422 overlaid on a view of the physical environment in front of the user. In some implementations, a transparency of the optical assembly (e.g., a lens) may be adjusted to suit a computer generated reality application (e.g., a virtual reality application or an augmented reality application).

For example, the interconnect 418 may be a system bus, or a wired or wireless network (e.g., a body area network).

The head-mounted display 410 includes a fastening article 420. The fastening article 420 may be configured to hold the head-mounted display 410 in place on a head of a user when the user is wearing the head-mounted display 410. For example, the fastening article 420 may include a headband. For example, the fastening article 420 may include a frame with arms that rest on ears of the user and hold a lens or a screen of the display 422 in front of an eye of the user.

The computing device 450 includes a processing apparatus 460. The processing apparatus 460 may be operable to execute instructions that have been stored in a data storage device 470. In some implementations, the processing apparatus 460 is a processor with random access memory for temporarily storing instructions read from the data storage device 470 while the instructions are being executed. The processing apparatus 460 may include single or multiple processors each having single or multiple processing cores. Alternatively, the processing apparatus 460 may include another type of device, or multiple devices, capable of manipulating or processing data. For example, the data storage device 470 may be a non-volatile information storage device such as a hard drive, a solid-state drive, a read-only memory device (ROM), an optical disc, a magnetic disc, or any other suitable type of storage device such as a non-transitory computer readable memory. The data storage device 470 may include another type of device, or multiple devices, capable of storing data for retrieval or processing by the processing apparatus 460. The processing apparatus 460 may access and manipulate data stored in the data storage device 470 via interconnect 494. For example, the data storage device 470 may store instructions executable by the processing apparatus 460 that upon execution by the processing apparatus 460 cause the processing apparatus 460 to perform operations (e.g., operations that implement the process 600 of FIG. 6).

The computing device 450 includes a wireless communications interface 480. The wireless communications interface 480 facilitates communication with other devices, including the head-mounted display 410. For example, wireless communications interface 480 may facilitate communication via a Wi-Fi network, a Bluetooth link, or a ZigBee link. The wireless communications interface 480 may be used to establish the wireless communications link 425 with the head-mounted display 410. In some implementations, the wireless communications interface 480 may be used to receive sensor data (e.g., motion sensor data and/or images) from the head-mounted display 410. In some implementations, the wireless communications interface 480 may be used to transmit, to the head-mounted display 410, data and/or instructions invoking presentation using the display 422 of a view of a CGR environment.

The computing device 450 includes a user interface 490. For example, the user interface 490 may include a touchscreen display. For example, the user interface 490 may include a microphone configured receive speech commands. For example, the user interface 490 may include an image sensor configured to detect hand gesture commands. For example, the user interface 490 may include a keyboard, a mouse, a joystick, and/or another handheld controller. For example, the user interface 490 may enable a user (e.g., the user wearing the head-mounted display 410) to enter commands to a CGR running on the computing device 450 and/or to change the configuration of a process associated with an object of a CGR environment of the CGR application.

The computing device 450 includes a network interface 492. The network interface 492 facilitates communication with other devices, for example, the localization server 120 or the content server 130. For example, network interface 492 may facilitate communication via the communications network 106. For example, network interface 492 may facilitate communication via a Wi-Fi network, a cellular network and/or a wired network. For example, network interface 492 may facilitate communication via a WiMAX network. For example, network interface 492 may facilitate communication via a fiber optic network.

For example, the interconnect 494 may be a system bus, or a wired or wireless network (e.g., a body area network).

The processing apparatus 460 may be configured to enable localization for CGR applications. For example, the processing apparatus 460 may be configured to access motion data captured using the one or more motion sensors 412, and determine, based on the motion data, a coarse localization pose. For example, the coarse localization pose may include a first estimate of position of the head-mounted display 410 and a first estimate of orientation of the head-mounted display. For example, the processing apparatus 460 may be configured to obtain one or more feature point maps. The feature point maps may be associated with a position of the coarse localization pose. For example, the processing apparatus 460 may be configured to access images captured using the one or more image sensors 414, and determine, based on the images, a fine localization pose by localizing into a feature point map of the one or more feature point maps. For example, the fine localization pose may include a second estimate of position of the head-mounted display and a second estimate of orientation of the head-mounted display. For example, the processing apparatus 460 may be configured to generate, based on the fine localization pose, a virtual object image including a view of a virtual object, and display the virtual object image using the head-mounted display. For example, the processing apparatus 460 may be configured to obtain the one or more feature point maps by transmitting, via a communications network (e.g., the communications network 106), the coarse localization pose to a localization server (e.g., the localization server 120), and receiving, via the communications network, the one or more feature point maps from the localization server. In some implementations, the one or more feature point maps from the localization server include a plurality of feature point maps received in succession, and the processing apparatus 460 may be configured to determine the fine localization pose by iteratively attempting to localize into the feature point maps of the plurality of feature point maps as they are received, requesting a next feature point map of the plurality of feature point maps from the localization server after failing to localize into a current feature point map of the plurality of feature point maps, and terminating reception of feature point maps of the plurality of feature point maps from the localization server responsive to successfully localizing into a current feature point map of the plurality of feature point maps. For example, the one or more feature point maps may be stored in an octree data structure that maps a physical space. For example, the one or more feature point maps may be associated with respective coordinates in a global coordinate system.

In some implementations, (not shown in FIG. 4), processing for a CGR application may be distributed between a processing apparatus in the head-mounted display 410 and the processing apparatus 460. For example, a simulation process may be run on a processing apparatus of the head-mounted display 410 to reduce latency for updates to the view of the CGR environment, while one or more processes associated with objects in the CGR environment may be run on the processing apparatus 460 to update the states of the objects. In some implementations, reality fragments may be transmitted via the wireless communications link 425 between the head-mounted display 410 and the computing device 450. Thus, the processing apparatus of the head-mounted display 410 and the processing apparatus 460 may operate as single processing apparatus distributed between the head-mounted display 410 and the computing device 450 that runs the CGR application and implements processes described herein (e.g., the process 600 of FIG. 6).

Figure 5:
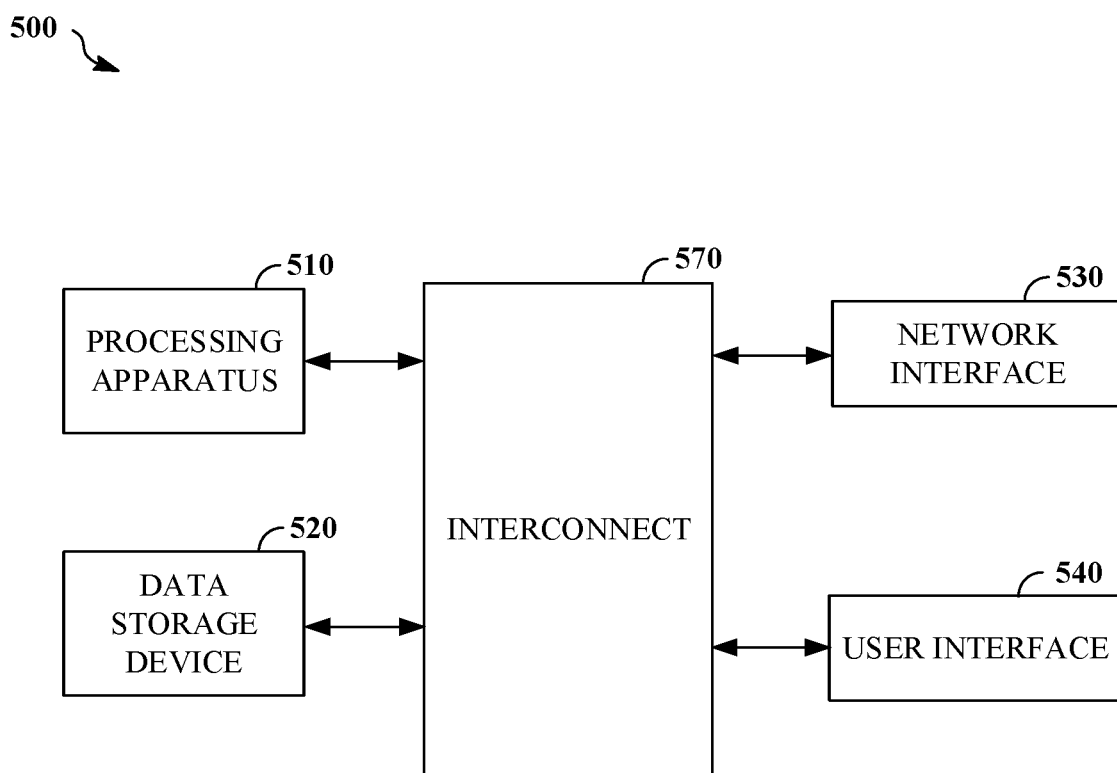
FIG. 5 is a block diagram of an example of a localization server configured to enable localization for CGR applications.

FIG. 5 is a block diagram of an example of a localization server 500 configured to enable localization for CGR applications. The localization server 500 includes a processing apparatus 510, a data storage device 520, a network interface 530, a user interface 540, and an interconnect 570 through which the processing apparatus 510 may access the other components. The localization server 500 may be configured to identify one or more feature point maps selected based on a coarse localization (e.g., including a global position and/or a global orientation), which may have been determined based on motion sensor data for a mobile computing device. For example, the localization server 500 may be configured to implement the process 900 of FIG. 9.

The processing apparatus 510 may be operable to execute instructions that have been stored in a data storage device 520. In some implementations, the processing apparatus 510 is a processor with random access memory for temporarily storing instructions read from the data storage device 520 while the instructions are being executed. The processing apparatus 510 may include single or multiple processors each having single or multiple processing cores. Alternatively, the processing apparatus 510 may include another type of device, or multiple devices, capable of manipulating or processing data. For example, the data storage device 520 may be a non-volatile information storage device such as a hard drive, a solid-state drive, a read-only memory device (ROM), an optical disc, a magnetic disc, or any other suitable type of storage device such as a non-transitory computer readable memory. The data storage device 520 may include another type of device, or multiple devices, capable of storing data for retrieval or processing by the processing apparatus 510. The processing apparatus 510 may access and manipulate data stored in the data storage device 520 via the interconnect 570. For example, the data storage device 520 may store instructions executable by the processing apparatus 510 that upon execution by the processing apparatus 510 cause the processing apparatus 510 to perform operations (e.g., operations that implement the process 900 of FIG. 9).

The network interface 530 facilitates communication with other devices, for example, the mobile computing device 110 or the head-mounted display 210. For example, network interface 530 may facilitate communication via the communications network 106. For example, network interface 530 may facilitate communication via a Wi-Fi network, a cellular network and/or a wired network. For example, network interface 530 may facilitate communication via a WiMAX network. For example, network interface 530 may facilitate communication via a fiber optic network.

The localization server 500 includes a user interface 540. For example, the user interface 540 may include a touchscreen display. For example, the user interface 540 may include a keyboard, a mouse, a joystick, and/or another handheld controller. For example, the user interface 540 may include a microphone configured receive speech commands. For example, the user interface 540 may include an image sensor configured to detect hand gesture commands. For example, the user interface 540 may enable a user (e.g., a system administrator) to enter commands to localization server to configure and/or maintain a collection feature point maps stored in a spatially partitioned data structure and/or other aspects of a localization service. For example, a feature point map may be updated based on new scans of regions space that apply a feature extraction algorithm to images of the region of space. In some implementations, global pose information associated with scanned images may be manually determined and entered based on surveying data and/or detailed design blueprints for buildings or other structures.

Figure 6:
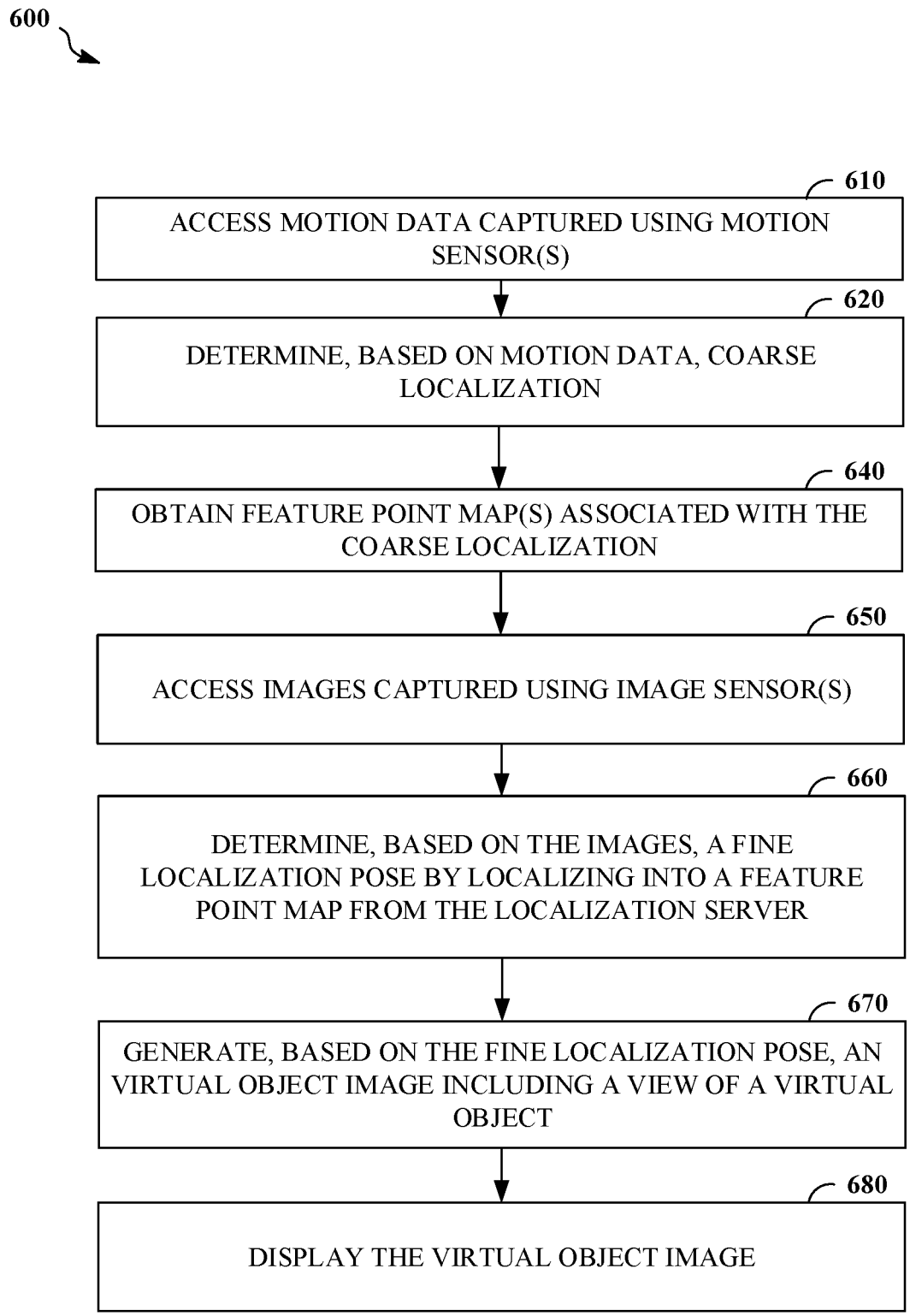
FIG. 6 is a flowchart of an example of a process for localization for CGR applications.

FIG. 6 is a flowchart of an example of a process 600 for localization for CGR applications. The process 600 includes accessing 610 motion data captured using one or more motion sensors; determining 620, based on the motion data, a coarse localization, wherein the coarse localization includes an first estimate of position; obtaining 640 one or more feature point maps associated with a position of the coarse localization; accessing 650 images captured using one or more image sensors; determining 660, based on the images, a fine localization pose by localizing into a feature point map of the one or more feature point maps; generating 670, based on the fine localization pose, a virtual object image including a view of a virtual object; and displaying 680 the virtual object image. For example, the process 600 may be implemented by the mobile computing device 110 of FIG. 1. For example, the process 600 may be implemented by the head-mounted display 210 of FIG. 2. For example, the process 600 may be implemented by the mobile computing device 300 of FIG. 3. For example, the process 600 may be implemented by the system 400 of FIG. 4.

The process 600 includes, at an electronic device having one or more motion sensors, accessing 610 motion data captured using the one or more motion sensors (e.g., the one or more motion sensors 330 or the one or more motion sensors 412). For example, the one or more motions sensors may include one or more accelerometers, gyroscopes, and/or magnetometers. In some implementations, the one or more motions sensors are coupled (e.g., attached) to a display (e.g., the display 350 or the head-mounted display 410). For example, the one or more motions sensors may include an inertial measurement unit. In some implementations, the one or more motion sensors include global position system receiver. In some implementations, the one or more motion sensors include receivers configured to estimate a location of a device including the one or more image sensors based on triangulation of wireless signals from the device. For example, a position of the device may be determined based on triangulation of Wi-Fi signals or cellular signals from the device. The motion data may be accessed 610 in variety of ways. For example, the motion data may be accessed 610 by reading directly from a sensor or from a memory via an interconnect (e.g., the interconnect 370). For example, the sensor data may be accessed 610 by receiving sensor data via a communications link (e.g., the wireless communications link 425).

The process 600 includes determining 620, based on the motion data, a coarse localization, wherein the coarse localization includes a first estimate of position of the electronic device (e.g., position of a mobile computing device). In some implementations, the coarse localization includes a global pose. For example, a coarse localization pose may be determined 620 based on the motion data. For example, the coarse localization pose may include a first estimate of position of a head-mounted display and a first estimate of orientation of the head-mounted display. For example, a position of the coarse localization may be determined as latitude, longitude, and altitude values from a GPS receiver. For example, a position of the coarse localization may be determined based on integration of accelerometer and/or gyroscope readings. For example, a position of the coarse localization may be determined triangulating wireless signals (e.g., Wi-Fi signals or cellular signals) received from the mobile computing device by remote wireless sensors. For example, an orientation of a course localization may be determined based on magnetometer and accelerometer readings. For example, an orientation of a course localization may be determined based on integration of gyroscope readings.

The process 600 includes obtaining 640 one or more feature point maps. The one or more feature point maps may be associated with a position of the coarse localization. For example, the one or more feature point maps are associated with a position of a coarse localization pose. For example, the one or more feature point maps may have been stored in a spatially partitioned data structure that is searched based on the coarse localization (e.g., a coarse localization pose). In some implementations, the one or more feature point maps may be obtained 640 from a localization server (e.g., the localization server 120). For example, the process 700 of FIG. 7 may be implemented to obtain 640 the one or more feature point maps. In some implementations, the localization server is configured to search a spatially partitioned data structure for candidate feature point maps that are near a position corresponding to the coarse localization, and prioritize the candidate feature point maps for transmission to the mobile computing device based on distance from the position corresponding to the coarse localization, comparison of an orientation corresponding to the coarse localization to a direction of a candidate feature point map from the position corresponding to the coarse localization, and/or point densities of feature point maps. For example, a localization server that the one or more feature point maps are obtained 640 from may implement the process 900 of FIG. 9. In some implementations, the one or more feature point maps may be obtained 640 by searching a world map database. For example, the one or more feature point maps may be obtained 640 by reading the one or more feature point maps from a memory (e.g., from the data storage device 320 or from the data storage device 470), where the world map database is stored locally in the mobile computing device. For example, the one or more feature point maps may be stored in an octree data structure that maps a physical space. For example, the one or more feature point maps may be associated with respective coordinates in a global coordinate system.

The process 600 includes accessing 650 images captured using one or more image sensors (e.g., the one or more image sensors 340 or the one or more image sensors 414). In some implementations, the one or more image sensors are coupled (e.g., attached) to the one or more motion sensors, which may include an inertial measurement unit. The one or more images may depict a region of space in the vicinity of a user wearing a head-mounted display (e.g., the head-mounted display 410). For example, an image may be accessed 610 by reading directly from an image sensor, by reading the image from memory or another storage device, or by receiving the image via a communications link (e.g., the wireless communications link 425) with another device.

The process 600 includes determining 660, based on the images, a fine localization pose by localizing into a feature point map of the one or more feature point maps. The fine localization pose may include a second estimate of position and an estimate of orientation. For example, the fine localization pose may include a second estimate of position of a head-mounted display (e.g., the head-mounted display 210 or the head-mounted display 410) and a second estimate of orientation of the head-mounted display. For example, bundle adjustment processing (e.g., using a SLAM (Simultaneous Localization And Mapping) algorithm) may be applied to localize into a feature point map to determine 660 the fine localization pose. In some implementations, the one or more feature point maps from the localization server include a plurality of feature point maps received in succession, and determining the fine localization pose includes iteratively attempting to localize into the feature point maps of the plurality of feature point maps as they are received. For example, the process 800 of FIG. 8 may be implemented to iteratively attempt to localize into a sequence of feature point maps until a localization into a feature point map is achieved.

The process 600 includes generating 670, based on the fine localization pose, a virtual object image including a view of a virtual object. For example, generating 670 a virtual object image may include rendering an image depicting a virtual object at a position (e.g., a global position) associated with the virtual object, as seen from the fine localization pose of the mobile computing device.

The process 600 includes displaying 680 the virtual object image (e.g., a left-eye image and/or a right-eye image). For example, the virtual object image (e.g., a left-eye image and/or a right-eye image) may be displayed 680 using a head-mounted display (e.g., the head-mounted display 210 or the head-mounted display 410) attached to the one or more image sensors. For example, the virtual object image may be displayed 680 using the display 350.

Figure 7:
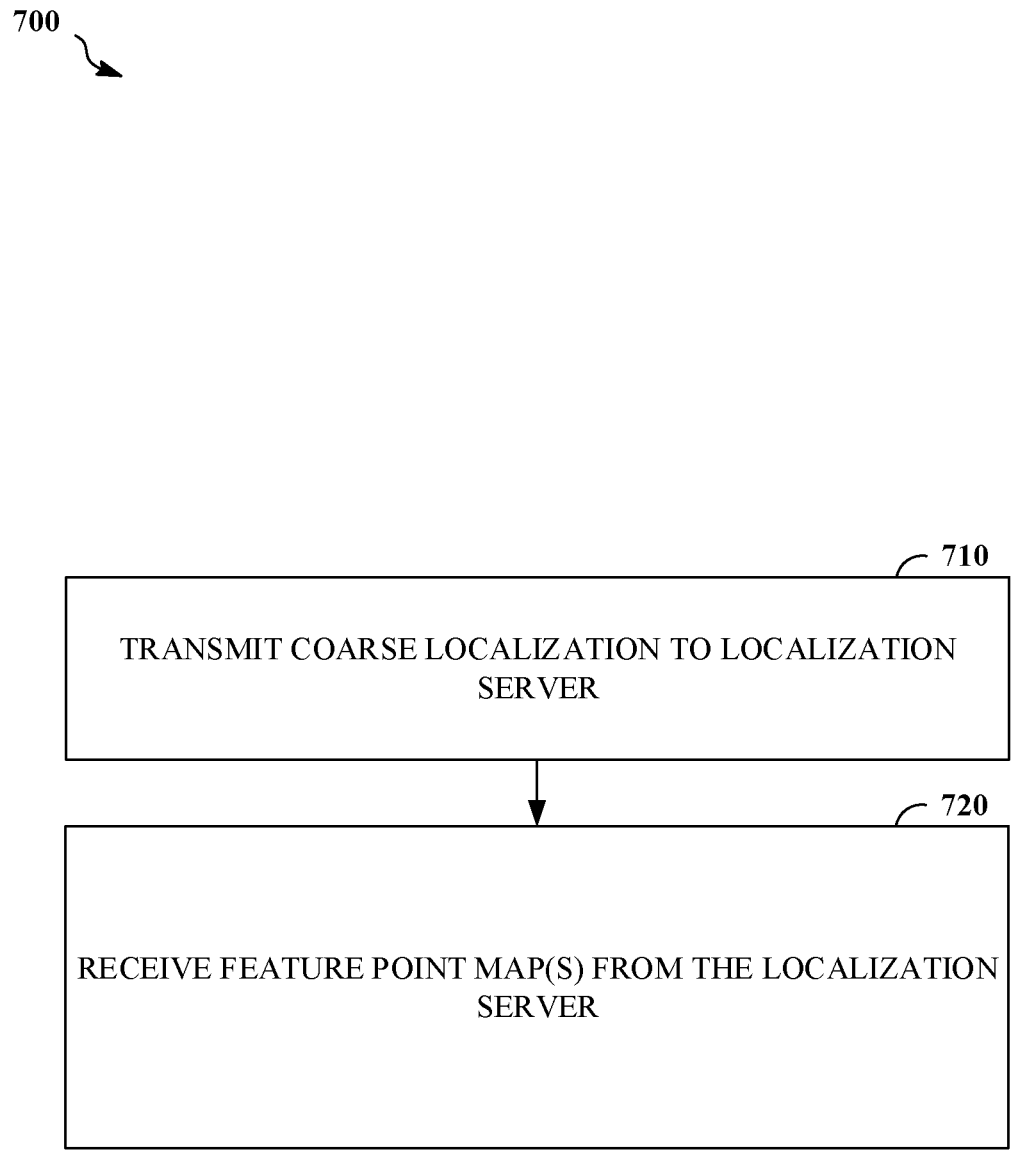
FIG. 7 is a flowchart of an example of a process for obtaining feature point maps associated with a coarse localization.

FIG. 7 is a flowchart of an example of a process 700 for obtaining feature point maps associated with a coarse localization. The process 700 includes transmitting 710 a coarse localization to a localization server; and receiving 720 one or more feature point maps from the localization server. For example, the process 700 may be implemented by the mobile computing device 110 of FIG. 1. For example, the process 700 may be implemented by the head-mounted display 210 of FIG. 2. For example, the process 700 may be implemented by the mobile computing device 300 of FIG. 3. For example, the process 700 may be implemented by the system 400 of FIG. 4.

The process 700 includes transmitting 710, via a communications network (e.g., the communication network 106), the coarse localization (e.g., including a coarse localization pose) to a localization server (e.g., the localization server 120). For example, the coarse localization may be transmitted 710 using the network interface 360. For example, the coarse localization may be transmitted 710 using the network interface 492.

The process 700 includes receiving 720, via the communications network (e.g., the communication network 106), one or more feature point maps from the localization server (e.g., the localization server 120). For example, the one or more feature point maps may be received 720 using the network interface 360. For example, the one or more feature point maps may be received 720 using the network interface 492.

Figure 8:
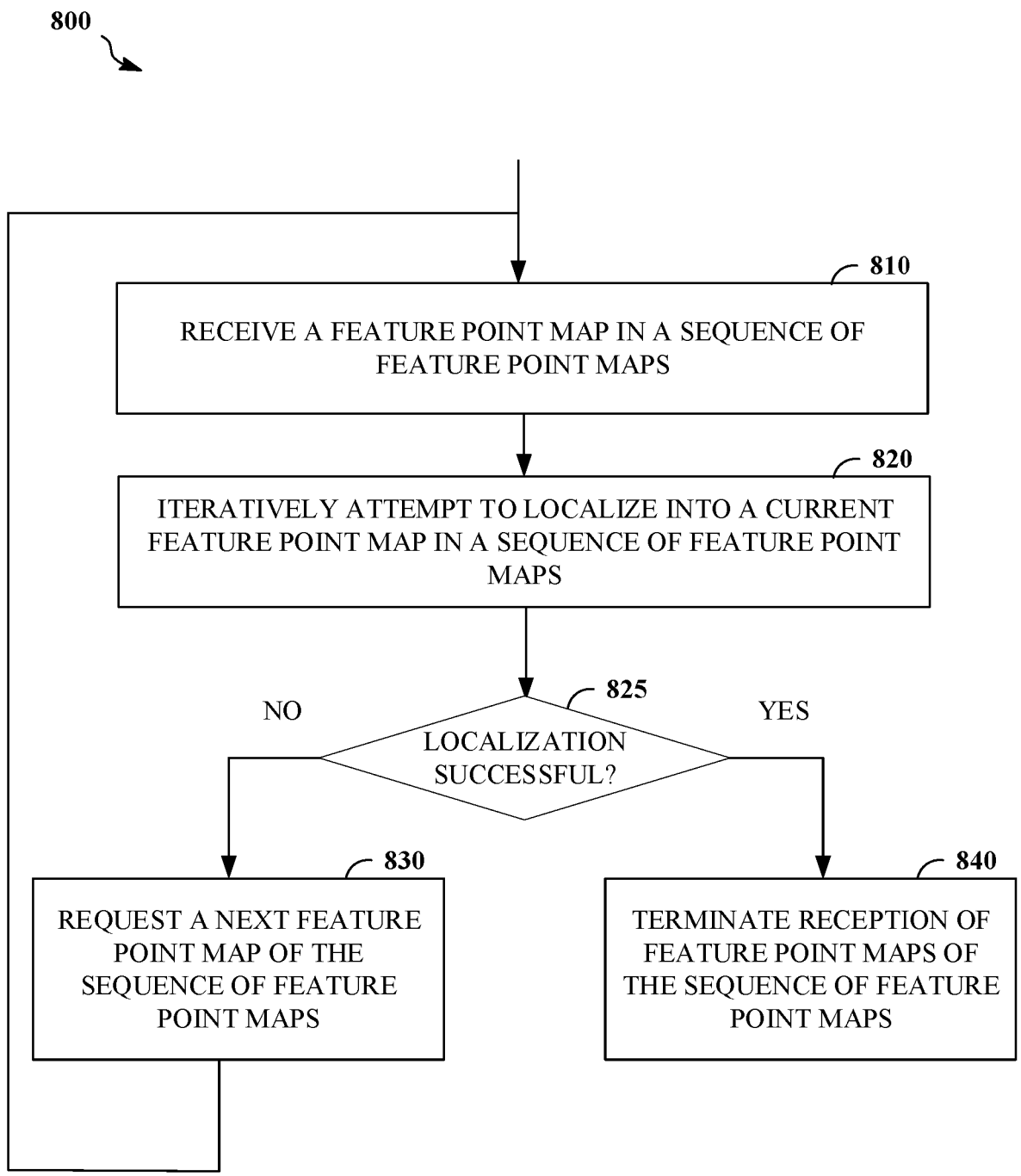
FIG. 8 is a flowchart of an example of a process for iteratively obtaining feature point maps associated with a coarse localization to determine a fine localization.

FIG. 8 is a flowchart of an example of a process 800 for iteratively obtaining feature point maps associated with a coarse localization to determine a fine localization. For example, the one or more feature point maps from the localization server include a sequence of feature point maps received in succession. For example, the localization server may prioritize the feature point maps (e.g., using the process 900 of FIG. 9) and arrange them in the sequence in an effort to reduce the number of localization attempts that will be made by the mobile computing device before a successful localization and to reduce the delay associated with performing those localization attempts. The process 800 includes receiving 810 a feature point map in a sequence of feature point maps; iteratively attempting to localize 820 into a current feature point map in the sequence of the feature point maps; if (at 825) the localization of the current feature point map is not successful, requesting 830 a next feature point map of the sequence of feature point maps from the localization server; and, if (at 825) the localization of the current feature point map is successful, terminating 840 reception of feature point maps of the sequence of feature point maps from the localization server. For example, the process 800 may be implemented by the mobile computing device 110 of FIG. 1. For example, the process 800 may be implemented by the head-mounted display 210 of FIG. 2. For example, the process 800 may be implemented by the mobile computing device 300 of FIG. 3. For example, the process 800 may be implemented by the system 400 of FIG. 4.

The process 800 includes receiving 810 a feature point map in a sequence of feature point maps. For example, the current feature point map may be received 810 using the network interface 360 or the network interface 492.

The process 800 includes iteratively attempting to localize 820 into the feature point maps of the sequence of feature point maps as they are received 810. For example, bundle adjustment processing (e.g., using a SLAM (Simultaneous Localization And Mapping) algorithm) may be applied to attempt to localize 820 into a current feature point map to determine a fine localization pose.

When (at 825) localization into the current feature point map is not successful, the process 800 includes requesting 830 a next feature point map of the sequence of feature point maps from the localization server (e.g., the localization server 120) after failing to localize into a current feature point map of the sequence of feature point maps. For example, requesting 830 a next feature point map may include transmitting a request message to the localization server using the network interface 360 or the network interface 492.

When (at 825) localization into the current feature point map is successful, the process 800 includes terminating 840 reception of feature point maps of the sequence of feature point maps from the localization server (e.g., the localization server 120) responsive to successfully localizing into a current feature point map of the sequence of feature point maps.

FIG. 9 is a flowchart of an example of a process 900 for identifying one or more feature point maps for transmission based on a coarse localization. For example, the one or more feature point maps may be stored in a spatially partitioned data structure. For example, the one or more feature point maps may be stored in an octree data structure that maps a physical space. In some implementations, the one or more feature point maps are associated with respective coordinates in a global coordinate system. The process 900 includes searching 910 a spatially partitioned data structure for candidate feature point maps that are near a position corresponding to a coarse localization; and prioritizing 920 the candidate feature point maps for transmission. For example, the process 900 may be implemented by the localization server 120 of FIG. 1. For example, the process 900 may be implemented by the localization server 500 of FIG. 5.

The process 900 includes searching 910 the spatially partitioned data structure for candidate feature point maps that are near a position corresponding to the coarse localization (e.g., a coarse localization pose). In some implementations, the spatially partitioned data structure may be searched 910 to find feature point maps corresponding to positions within a maximum distance from a position of the fine localization of the mobile computing device. In some implementations, the spatially partitioned data structure may be searched 910 to find feature point maps corresponding to positions along a ray cast from a position of the fine localization of the mobile computing device based on an orientation of the fine localization of the mobile computing device. In some implementations, the spatially partitioned data structure may be searched 910 to find feature point maps corresponding to positions appearing within a field of view of one or more image sensors of the mobile computing device based on a fine localization pose of the mobile computing device.

The process 900 includes prioritizing 920 the candidate feature point maps for transmission. For example, the candidate feature point maps may be prioritized 920 for transmission based on distance from the position corresponding to the coarse localization pose. For example, the candidate feature point maps may be prioritized 920 for transmission based on comparison of an orientation corresponding to a coarse localization pose to a direction of a candidate feature point map from the position corresponding to the coarse localization pose. For example, the candidate feature point maps may be prioritized 920 for transmission based on a feature point density of a candidate feature point map. In some implementations, the candidate feature point maps may be prioritized 920 for transmission based on a combination of factors, including distance from a position, direction from a position, and/or point densities of the candidate feature point maps.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide location data for targeted content delivery services. In yet another example, users can select to limit the length of time location data is maintained or entirely prohibit the development of a location history. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time.

What is claimed is:

1. A system comprising:
a display device;
one or more image sensors coupled to the display device;
one or more motion sensors coupled to the display device; and
a processing apparatus configured to:
 access motion data captured using the one or more motion sensors;
 determine, based on the motion data, a coarse localization pose, wherein the coarse localization pose includes a first estimate of position of the display device and a first estimate of orientation of the display device;
 obtain one or more feature point maps by transmitting, via a communications network, the coarse localization pose to a server and receiving, via the communications network, the one or more feature point maps from the server, wherein the feature point maps are associated with a position of the coarse localization pose and the one or more feature point maps from the server include a plurality of feature point maps received in succession that have been prioritized by the server based on the coarse localization pose;
 access images captured using the one or more image sensors;
 determine, based on the images, a fine localization pose by localizing into a feature point map of the one or more feature point maps, wherein the fine localization pose includes a second estimate of position of the display device and a second estimate of orientation of the display device;
 generate, based on the fine localization pose, a virtual object image including a view of a virtual object; and
 display the virtual object image using the display device.

2. The system of claim 1, wherein the one or more feature point maps are stored in a spatially partitioned data structure, and the server is configured to:
 search the spatially partitioned data structure for candidate feature point maps that are near a position corresponding to the coarse localization pose; and
 prioritize the candidate feature point maps for transmission based on distance from the position corresponding to the coarse localization pose.

3. The system of claim 1, wherein the one or more feature point maps are stored in a spatially partitioned data structure, and the server is configured to:
 search the spatially partitioned data structure for candidate feature point maps that are near a position corresponding to the coarse localization pose; and
 prioritize the candidate feature point maps for transmission based on comparison of an orientation corresponding to the coarse localization pose to a direction of a candidate feature point map from the position corresponding to the coarse localization pose.

4. The system of claim 1, wherein the one or more feature point maps are stored in a spatially partitioned data structure, and the server is configured to:
 search the spatially partitioned data structure for candidate feature point maps that are near a position corresponding to the coarse localization pose; and
 prioritize the candidate feature point maps for transmission based on a feature point density of a candidate feature point map.

5. The system of claim 1, wherein the one or more feature point maps are stored in an octree data structure that maps a physical space.

6. The system of claim 1, wherein the one or more feature point maps are associated with respective coordinates in a global coordinate system.

7. The system of claim 1, wherein the one or more motion sensors include a global position system receiver.

8. A system comprising:
a display device;
one or more image sensors coupled to the display device;
one or more motion sensors coupled to the display device; and
a processing apparatus configured to:
 access motion data captured using the one or more motion sensors;
 determine, based on the motion data, a coarse localization pose, wherein the coarse localization pose includes a first estimate of position of the display device and a first estimate of orientation of the display device;

obtain one or more feature point maps from a server, wherein the feature point maps are associated with a position of the coarse localization pose;
access images captured using the one or more image sensors;
determine, based on the images, a fine localization pose by localizing into a feature point map of the one or more feature point maps, wherein the fine localization pose includes a second estimate of position of the display device and a second estimate of orientation of the display device, wherein the one or more feature point maps from the server include a plurality of feature point maps received in succession, and the processing apparatus is configured to determine the fine localization pose by:
  iteratively attempting to localize into the feature point maps of the plurality of feature point maps as they are received,
  requesting a next feature point map of the plurality of feature point maps from the server after failing to localize into a current feature point map of the plurality of feature point maps, and
  terminating reception of feature point maps of the plurality of feature point maps from the server responsive to successfully localizing into a current feature point map of the plurality of feature point maps;
generate, based on the fine localization pose, a virtual object image including a view of a virtual object; and
display the virtual object image using the display device.

9. A method comprising:
at an electronic device having one or more motion sensors, accessing motion data captured using the one or more motion sensors;
determining, based on the motion data, a coarse localization, wherein the coarse localization includes a first estimate of position of the electronic device;
obtaining one or more feature point maps by transmitting, via a communications network, the coarse localization pose to a server and receiving, via the communications network, the one or more feature point maps from the server, wherein the feature point maps are associated with a position of the coarse localization and the one or more feature point maps from the server include a plurality of feature point maps received in succession that have been prioritized by the server based on the coarse localization pose;
accessing images captured using one or more image sensors;
determining, based on the images, a fine localization pose by localizing into a feature point map of the one or more feature point maps, wherein the fine localization pose includes a second estimate of position and an estimate of orientation;
generating, based on the fine localization pose, a virtual object image including a view of a virtual object; and
displaying the virtual object image.

10. The method of claim 9, wherein the one or more motion sensors include receivers configured to estimate a location of a device including the one or more image sensors based on triangulation of wireless signals from the device.

11. The method of claim 9, wherein the coarse localization includes a global pose.

12. The method of claim 9, wherein the virtual object image is displayed using a head-mounted display attached to the one or more image sensors.

13. The method of claim 9, wherein the one or more feature point maps are stored in a spatially partitioned data structure, and the server is configured to:
  search the spatially partitioned data structure for candidate feature point maps that are near a position corresponding to the coarse localization; and
  prioritize the candidate feature point maps for transmission based on distance from the position corresponding to the coarse localization.

14. The method of claim 9, wherein the one or more feature point maps are stored in a spatially partitioned data structure, and the server is configured to:
  search the spatially partitioned data structure for candidate feature point maps that are near a position corresponding to the coarse localization; and
  prioritize the candidate feature point maps for transmission based on comparison of a coarse orientation corresponding to the coarse localization to a direction of a candidate feature point map from the position corresponding to the coarse localization.

15. The method of claim 9, wherein the one or more feature point maps are stored in a spatially partitioned data structure, and the server is configured to:
  search the spatially partitioned data structure for candidate feature point maps that are near a position corresponding to the coarse localization; and
  prioritize the candidate feature point maps for transmission based on a feature point density of a candidate feature point map.

16. The method of claim 9, wherein the one or more feature point maps are stored in an octree data structure that maps a physical space.

17. A method comprising:
at an electronic device having one or more motion sensors, accessing motion data captured using the one or more motion sensors;
determining, based on the motion data, a coarse localization, wherein the coarse localization includes a first estimate of position of the electronic device;
obtaining one or more feature point maps from a server, wherein the feature point maps are associated with a position of the coarse localization;
accessing images captured using one or more image sensors;
determining, based on the images, a fine localization pose by localizing into a feature point map of the one or more feature point maps, wherein the fine localization pose includes a second estimate of position and an estimate of orientation, wherein the one or more feature point maps from the server include a plurality of feature point maps received in succession, and determining the fine localization pose comprises:
  iteratively attempting to localize into the feature point maps of the plurality of feature point maps as they are received,
  requesting a next feature point map of the plurality of feature point maps from the server after failing to localize into a current feature point map of the plurality of feature point maps, and
  terminating reception of feature point maps of the plurality of feature point maps from the server responsive to successfully localizing into a current feature point map of the plurality of feature point maps;
generating, based on the fine localization pose, a virtual object image including a view of a virtual object; and
displaying the virtual object image.

18. A non-transitory computer-readable storage medium comprising executable instructions that, when executed by a processor, facilitate performance of operations comprising:
- accessing motion data captured using one or more motion sensors;
- determining, based on the motion data, a coarse localization, wherein the coarse localization includes a first estimate of position;
- obtaining one or more feature point maps by transmitting, via a communications network, the coarse localization pose to a server and receiving, via the communications network, the one or more feature point maps from the server, wherein the feature point maps are associated with a position of the coarse localization and the one or more feature point maps from the server include a plurality of feature point maps received in succession that have been prioritized by the server based on the coarse localization pose;
- accessing images captured using one or more image sensors;
- determining, based on the images, a fine localization pose by localizing into a feature point map of the one or more feature point maps, wherein the fine localization pose includes a second estimate of position and an estimate of orientation;
- generating, based on the fine localization pose, a virtual object image including a view of a virtual object; and
- displaying the virtual object image.

19. The non-transitory computer-readable storage medium of claim 18, wherein the one or more feature point maps are stored in a spatially partitioned data structure, the operations further comprising:
- searching the spatially partitioned data structure for candidate feature point maps that are near a position corresponding to the coarse localization pose; and
- prioritizing the candidate feature point maps for transmission based on distance from the position corresponding to the coarse localization pose.

20. The non-transitory computer-readable storage medium of claim 18, wherein the one or more feature point maps are stored in a spatially partitioned data structure, the operations further comprising:
- searching the spatially partitioned data structure for candidate feature point maps that are near a position corresponding to the coarse localization pose; and
- prioritizing the candidate feature point maps for transmission based on comparison of an orientation corresponding to the coarse localization pose to a direction of a candidate feature point map from the position corresponding to the coarse localization pose.

21. The non-transitory computer-readable storage medium of claim 18, wherein the one or more feature point maps are stored in a spatially partitioned data structure, the operations further comprising:
- searching the spatially partitioned data structure for candidate feature point maps that are near a position corresponding to the coarse localization pose; and
- prioritizing the candidate feature point maps for transmission based on a feature point density of a candidate feature point map.

* * * * *